United States Patent

Morris et al.

Patent Number: 5,262,058
Date of Patent: Nov. 16, 1993

[54] PURIFICATION OF HYDROGEN PEROXIDE

[75] Inventors: Gareth W. Morris, Wirral; Neil D. Feasey, Widnes, both of England

[73] Assignee: Interox Chemicals Limited, London, England

[21] Appl. No.: 768,271

[22] PCT Filed: Apr. 6, 1990

[86] PCT No.: PCT/GB90/00522
§ 371 Date: Oct. 1, 1991
§ 102(e) Date: Oct. 1, 1991

[87] PCT Pub. No.: WO90/11967
PCT Pub. Date: Oct. 18, 1990

[30] Foreign Application Priority Data
Apr. 12, 1989 [GB] United Kingdom ........... 8908210

[51] Int. Cl.$^5$ ............................................. B01D 15/00
[52] U.S. Cl. ...................................... 210/663; 210/688
[58] Field of Search ............... 210/663, 688; 423/273, 423/584

[56] References Cited

U.S. PATENT DOCUMENTS 2,017,440 10/1935 Hawkinson ............... 423/584

Primary Examiner—Ivars Cintins
Attorney, Agent, or Firm—Larson and Taylor

[57] ABSTRACT

The electronics industry demands that hydrogen peroxide for use therein be purified to very low levels of impurities, currently at the level of a few ppb for some impurities, or even lower. However, existing methods are either inherently unsafe because they bring concentrated hydrogen peroxide into contact with a concentrate of transition metal decomposition agents for peroxide and a purification resin which acts as a source of carbon, or are unable to attain the desired impurity level. The instant purification process first makes a concentrated suspension of stannic oxide particles in an aqueous medium, which can include aqueous hydrogen peroxide, by subjecting the mixture to high shear mixing, introducing an effective amount of the dispersion into the peroxide solution and filtering the mixture so as to remove the stannic oxide particles that now are loaded with ionic impurities, and particularly with transition metal ions. Purification to very low impurity levels can accordingly be made with improved safety.

11 Claims, No Drawings

PURIFICATION OF HYDROGEN PEROXIDE

The present invention relates to processes for the purification of hydrogen peroxide solutions and particularly to the production of solutions in which metallic impurity contents have been reduced to very low levels.

Aqueous hydrogen peroxide solutions are currently made or have been proposed to be made by a variety of different techniques. These include electrolytic techniques often involving hydrolysis of persulphuric acid or a salt thereof, autoxidation techniques in which a carrier, typically an alkyl-substituted anthraquinone, is subjected cyclically to reduction with hydrogen, oxidation with air and extraction of hydrogen peroxide with water and more recently processes involving the direct oxidation of hydrogen with oxygen in the presence of certain catalysts and under selected conditions.

Many variations of the foregoing manufacturing techniques are known. After the aqueous hydrogen peroxide solutions have been formed, they can be concentrated and purified to some extent by water removal or distillation techniques. Although the hydrogen peroxide manufacturing techniques differ markedly in their operation, they share the common result that the aqueous hydrogen peroxide solution obtained, even after distillation, contains significant amounts of residual impurities, including in particular a number of metal ions.

Although there has always been a desire to obtain aqueous hydrogen peroxide solutions of high purity, a qualitative term, the use of hydrogen peroxide in the semiconductor and allied electronics industries has imposed new and increasingly stringent, quantitative standards on the term in recent years. This is because such industries have demanded since their inception lower levels of residual impurities that could remain in peroxide solutions than were tolerable for other purposes, but also because their purity specifications have become increasingly tight, especially noticeably during the period of 1985 to date. It is convenient to call hydrogen peroxide solutions which meet 1988/9 impurity standards as ultra-pure so as to distinguish them from the state of the art products of former eras, which tolerated much higher impurity levels.

It is recognised that various techniques have already been proposed or used for the purification of hydrogen peroxide solutions and these include distillation and related water-removal techniques. These can be especially useful for the removal of organic impurities, such as compounds employed in autoxidation manufacturing methods, but are of lesser value for removing inorganic ions like metals or acidic anions in that they tend to remain to a greater or lesser extent in the aqueous hydrogen peroxide rather than being carried out in the distillate water.

More recently, an alternative purification technique has been suggested which comprises passing an impure aqueous hydrogen peroxide solution through a bed of certain types of ion exchange resins that are preferably in acid form. Such a technique is described, for example in Japanese Kokai 62-187103 (1987) to Wako Junyaku KK. This technique is capable of removing metal ion impurities, but the extent of its effectiveness brings with it, inevitably, a corresponding increase in the probability of an explosion when employing the technique to purify high concentrations of hydrogen peroxide in commercial quantities. The increased risk runs hand in hand with its effectiveness at purification because the initial action of the ion exchange resin removing the impurity levels of, in particular, transition metal ions such as copper, iron, chromium, vanadium etc, from solution is to concentrate them in and on the surface of the ion exchange resin. Such metals are well-known decomposition agents for hydrogen peroxide. This means that the hydrogen peroxide in the solution being purified is now brought into contact with a surface that carries concentrated decomposition catalysts. The risk is automatically increased of a localised decomposition of hydrogen peroxide occurring which increases the temperature locally, thereby further promoting decomposition, particularly from concentrated hydrogen peroxide. If the temperature rise is rapid enough to counter the effects of liquid mixing in the apparatus, or if there are dead spots, the decomposition becomes self-propagating through the remainder of the hydrogen peroxide and manifests itself as an explosion that destroys the purification plant or apparatus. The present inventors are aware that such occurrences had occurred during trials with ion exchange resins and were keen to devise a technique that would avoid such disturbing occurrences.

There have also been a number of processes proposed for purifying hydrogen peroxide solutions in which the particularly aggressive transition metal ions have been replaced by more benign ions such as alkali metals. Although such techniques may produce a product that is acceptable for some purposes, they are not acceptable in the electronics field because the levels of such metals too are strictly limited in their product specifications. Thus, the processes of U.S. Pat. No. 2,027,839 assigned to Du Pont or GB 409 361 in the name of Roessler & Hasslacher Chemical Company are not suitable for the instant purpose by virtue of their introduction of substitute metal ions or counterions that are not removed.

In addition to processes for purifying aqueous hydrogen peroxide solutions, there have been many proposals which describe ways of stabilising such solutions against decomposition of the hydrogen peroxide during its storage. Many of such proposals rely upon the introduction of inorganic and/or organic materials in which chelate with or Otherwise interact with metals ions in situ, so as to lessen the effect of their contact with hydrogen peroxide. Whilst such proposals may be successful to a greater or lesser extent for stabilisation, they inevitably introduce a number of foreign substances into the solution and are therefore the antithesis of purification processes.

It is an object of the present invention to devise a process that is capable of purifying concentrated hydrogen peroxide solutions to very high levels of purity without encountering the high level of risk associated with resin purification techniques. It is a second object of the invention to remove transition metal impurities from concentrated hydrogen peroxide solutions without substituting other metal ions in their stead. Other and further objects of the invention, or of preferred aspects of the invention may be determined from the subsequent description of the invention or prefered aspects thereof.

According to the present invention, there is provided a process for the purification of an impure aqueous hydrogen peroxide solution in which:

step a) a dispersion of hydrated stannic oxide is formed by introducing particulate stannic oxide into water or an aqueous hydrogen peroxide solution and subjecting it to high shear mixing;

step b) an effective amount of the dispersion is introduced into and distributed throughout the impure aqueous hydrogen peroxide solution whilst metallic impurities in the solution are adsorbed by the stannic oxide;

and in step c) the solid stannic oxide is filtered out, resulting in a purified hydrogen peroxide solution.

By the use of the invention technique, it is possible to lower by a substantial extent the impurity levels of commonly encountered interfering ions, and particularly transition metal ions without introducing or increasing the content of counter-ions such as acid anions or other replacement cations such as sodium cations, an introduction or increase which would thereby leave the resultant solution unacceptable for the purposes for which it was being purified, such as for electronic grade material. It will be recognised that the term effective herein with respect to the purifying agent indicates that a detectable reduction in metal ion concentration is obtainable.

It will be understood that it is not sufficient, by itself, to employ a simple suspension of stannic oxide as the material that is introduced into the aqueous hydrogen peroxide solution. It is important to employ the appropriate method. The inventors are aware that colloidal suspensions of stannic oxide can be made in situ or in a preparatory step by the introduction of a soluble tin compound such as sodium stannate or stannic chloride into an alkaline medium, but such methods are not suitable for the present invention. This is because generation of the suspension in situ inevitably introduces significant contents of impurity ions, be they replacement metal ions or counterions which are retained in the hydrogen peroxide solution, thereby negating to a substantial extent the beneficial transition metal ion-removal qualities of the material. Generation of the suspension in a preparatory step was also not a suitable procedure in view of the difficulties in removing the replacement metal or counterions effectively from the gelatinous stannic oxide material. On the other hand, introduction of preformed "off the shelf" solid particulate stannic oxide directly into the impure aqueous hydrogen peroxide solution, i.e. its introduction without being subjected to a prior dispersion in a compatible aqueous medium, results in a significantly inferior purification.

The first step in the present invention is effected using any apparatus that is capable of applying high shear to a liquid. The particular type of apparatus is not critical, provided that it is operated appropriately. Thus, the apparatus can be based upon propellor or turbine agitation or can comprise a colloid mill or an homogeniser. It will be recognised that high shear technology applicable to the production of liquid emulsions, such as emulsion paints, can be applied in the present invention.

The particulate stannic oxide employed preferably has a purity of at least 99% w/w and the aqueous medium in which it is dispersed preferably comprises a solution of not greater than about 50% w/w hydrogen peroxide, and especially 20 to 50% w/w. Conveniently, its concentration in the medium can be matched with the hydrogen peroxide concentration of the solution to be purified. The water content of the medium preferably is distilled or de-ionised water. The aqueous medium can comprise an aqueous hydrogen peroxide solution that has been purified by the process of the present invention, if desired. The proportion of solids in the suspension is usually from 5 to 35% w/w of the total weight of solids and suspending liquid. The suspension can be rehomogenised it if has settled during storage.

Advantageously, the amount of dispersion that is employed in the second step is small, but is selected in conjunction with the initial levels of ionic impurities in order to provide an effective amount. The effective amount is normally selected in the range of at least 1 part and typically from 1 to 50 parts w/w per 1000 parts of the impure hydrogen peroxide solution, and in many instances is selected in the range of from 5 to 20 parts dispersion per 1000 parts impure peroxide solution, each part of purifying agent being calculated as a dispersion of 1000 ppm stannic oxide. In an alternative way of expressing how much material is employed, a suitable amount of stannic oxide (expressed as Sn) is often in the range of 1 to 50 mg solids per liter of impure peroxide solution and preferably in the range of 5 to 20 mg/l. Use of higher amounts of stannic oxide than those indicated above can be contemplated on technical grounds, but in practice would often be either unnecessary or less attractive commercially.

In the second step, the dispersion can be distributed throughout the aqueous hydrogen peroxide by gentle agitation. The mixture is preferably maintained for a residence period that is long enough for the stannic oxide material to adsorb a substantial fraction of the maximum amount of impurity ions which it is capable of adsorbing in the prevailing conditions. At the discretion of the user of the process, he can either monitor the solution to detect the residual level of, for example, a representative impurity such as iron and determine from the results when the rate of impurity removal has fallen below an aceptable rate, or he can decide in advance upon a preset contact period. The latter can possibly be determined on the basis of previous sighting trials or prior monitoring of related impure solutions. The contact period is normally at least 10 minutes before it is passed to the subsequent filtration step, and can advantageously often be at least 30 minutes. Although the contact period is often not longer than about 500 minutes, on account of commercial constraints to optimise throughput, such contact periods would be readily tolerable from the viewpoint of the stability of the hydrogen peroxide solution.

The purification process of the present invention can be employed in respect of any aqueous solution containing about 70% w/w hydrogen peroxide or less and in many instances it will have a concentration in the range of 1 to 70%, and especially 5 to 70% w/w. The process can therefore be employed for concentrated hydrogen peroxide solutions, such as those containing 30 to 70% w/w $H_2O_2$. If desired, the concentration of hydrogen peroxide in the stannic oxide suspension and the impure hydrogen peroxide solutions can be matched.

In the filtration step, the type of filter is selected having regard to the sub-micron particle size of the stannic oxide particles. In practice, the filtration techniques applicable to this step include microfiltration, ultracentrifugation and especially ultrafiltration. Examples of apparatus for effecting such techniques are well known in the art and need no further description here. Apparatus that is capable of filtering out small particles of about 0.1 microns diameter or larger diameter, and particularly from 0.07 to 0.25 microns is of direct applicability in the present invention. It is preferable to select the material of construction of the filter/filter membrane from those materials which do not release substantial quantities of ions into solution, such as PTFE.

The invention process can be carried as a once through operation, if desired. Alternatively, the hydrogen peroxide purification can be repeated, in a cycle of steps 2 and 3, if desired, thereby improving the purification further. It is generally observable that the extent of improvement with each repeat cycle tends to diminish as the number of cycles increases. Thus, it can often be beneficial to employ at least two or three cycles, but the sixth and subsequent cycles can typically result in little detectable improvement in product purity. It will be recognised that in view of the small amount of purifying agent employed, it is often most convenient to merely discard the filtered impurity-loaded stannic oxide material. An alternative technique, less favoured, comprises the re-suspension of stannic oxide that is only lightly impurity-loaded, such as from a third or fourth purification cycle and employing it in an earlier cycle, such as the first or second cycle in the purification of further hydrogen peroxide solutions subsequently.

Alternatively or additionally to repeating the invention process in a cycle, the invention process can be supplemented in a polishing step, in which the purified peroxide solution is subsequently contacted with a suitable amount of an effective ion exchange resin in hydrogen form, i.e. the very types of resin which would be unsafe to treat the unpurified hydrogen peroxide solution. This combination of purification techniques can be contemplated with equanimity, provided the stannic oxide treatment is carried out first, because the prior treatment with stannic oxide is so effective at removing from the composition the transition metal ions that cause peroxide decomposition and render the resin purification technique unsafe. The resin is conveniently a pyridine-type anion exchange resin as described in Japanese Kokai 62-187103 to Wako Junyaku Kogyo, or polystyrenedivinyl benzene resins. The result of such a polishing treatment is to further reduce the concentration of alkali or alkaline earth metal ions, such as sodium.

The aqueous hydrogen peroxide solution to be treated can be product extracted from a conventional current manufacturing process, such as an AO process, or such a product that has been subjected to a distillation process and/or a dilution process with deionised or distilled water. It will be understood that to some extent the purity of the purified product depends upon the extent of impurity levels in the impure product and naturally also to the extent to which multiple cycles of the invention process and/or a subsequent polishing process have been employed.

Having described the invention in general terms, specific embodiments thereof will now be described in greater detail by way of non-limiting example.

EXAMPLE 1

Purification a) Preparation of the stannic oxide dispersion

A solution of approximately 35% w/w solution of aqueous hydrogen peroxide was prepared by diluting a sample of distilled aqueous hydrogen peroxide solution that assayed at about 85% w/w $H_2O_2$ into the appropriate volume of deionised water, with stirring and cooling to prevent the solution temperature exceeding about 50° C. Particulate stannic oxide (1.0 g, GPR grade from BDH Chemicals) was introduced into approximately 1000 ml of the 35% hydrogen peroxide solution held in a stainless steel beaker equipped with a rotating blade stirrer. The mixture was shear stirred at approximately 5000 rpm for 2 hours. The resultant mixture comprised a dispersion of stannic oxide having a concentration of approximately 1000 ppm.

b) Treatment of the Hydrogen Peroxide solution

A portion, 50 ml, of the stannic oxide suspension produced in a) was then introduced into 5 liters of 35% w/w hydrogen peroxide solution containing initially 30 ppb iron (calculated as Fe) and agitated for a period of 30 minutes so as to disperse the suspension throughout the solution. The resultant mixture was then filtered through a microfilter made from PTFE and having a nominal pore size of 0.2 microns. The concentration of iron in the filtrate was measured at 13 ppb, representing a reduction of 56%. After 3 further similar treatments using each time a further 50 ml portion of the same suspension per 5 liters of hydrogen peroxide solution, the iron level had been further reduced to 7 ppb.

EXAMPLE 2

Purification plus Polishing

In stage 1 of this 2 stage process, a 35% w/w hydrogen peroxide solution was purified by a process similar to that of Example 1, resulting in a solution that contained 10 ppb sodium. In stage 2, the solution was contacted with an ion exchange resin available under the Trade Mark "Amberlite", grade IR-200C, which had been $H^+$ preexchanged using 5% nitric acid solution. The resin (2 g) was introduced into the peroxide solution (1 liter) and agitated for 2 hours. The solution was then filtered and the filtrate contained 2 ppb sodium.

We claim:

1. A process for the purification of an impure aqueous hydrogen peroxide solution in which the solution is brought into contact with a material capable of absorbing impurities therefrom, said process comprising:
   a) introducing particulate stannic oxide into water or an aqueous hydrogen peroxide solution to form a dispersion of hydrated stannic oxide;
   b) subjecting the dispersion to high shear mixing;
   c) introducing an effective amount of the dispersion into an impure aqueous hydrogen peroxide solution and distributing the introduced dispersion throughout the impure aqueous hydrogen peroxide solution whilst metallic impurities in the solution are absorbed by the stannic oxide; and
   d) filtering out the stannic oxide, resulting in a purified hydrogen peroxide solution.

2. A process according to claim 1 wherein said high shear mixing is carried out in a colloid mill or homogeniser or employs propellor or turbine agitation to provide high shear mixing.

3. A process according to claim 1 or claim 2 wherein, in step a), said stannic oxide is introduced into a solution of 20 to 50% w/w/ hydrogen peroxide.

4. A process according to claim 1 or claim 2 wherein the proportion of solids in said dispersion is in the range of from 5 to 35% w/w of the mixture.

5. A process according to claim 1 or claim 2 wherein the amount of dispersion introduced into the peroxide solution in step (c) is selected in the range of at least 1 part dispersion, calculated at a content of 1000 ppm stannic oxide, per 1000 parts w/w of peroxide solution.

6. A process according to claim 5 wherein the amount of dispersion introduced is selected in the range of from 5 to 20 mg solids per liter of peroxide solution.

7. A process according to claim 1 or claim 2 wherein aqueous hydrogen peroxide solution to be purified contains from 30 to 70% w/w hydrogen peroxide.

8. A process according to claim 1 or claim 2 wherein in step d) filtering is effected with a filter having an effective pore diameter of 0.07 to 0.25 microns.

9. A process according to claim 1 or claim 2 wherein the purified hydrogen peroxide solution is itself subjected to a further purification process.

10. A process according to claim 9 wherein the further purification process comprises a polishing sequence of contacting the peroxide solution with a cation exchange resin in H+ form, thereby to exchange alkali and alkaline earth metal ions from solution, and then filtering the solution.

11. A process according to claim 9 wherein said further purification comprises:

introducing an effective amount of said dispersion into said purified hydrogen peroxide solution, and distributing the introduced dispersion throughout the purified hydrogen peroxide solution whilst metallic impurities in the solution are adsorbed by the stannic oxide; and filtering out the stannic oxide, resulting in a further purified hydrogen peroxide solution.

* * * * *